E. BOMMER.
CHECKING DEVICE FOR OSCILLATORY MOVEMENT.
APPLICATION FILED MAR. 11, 1915.
1,241,084. Patented Sept. 25, 1917.
3 SHEETS—SHEET 1.
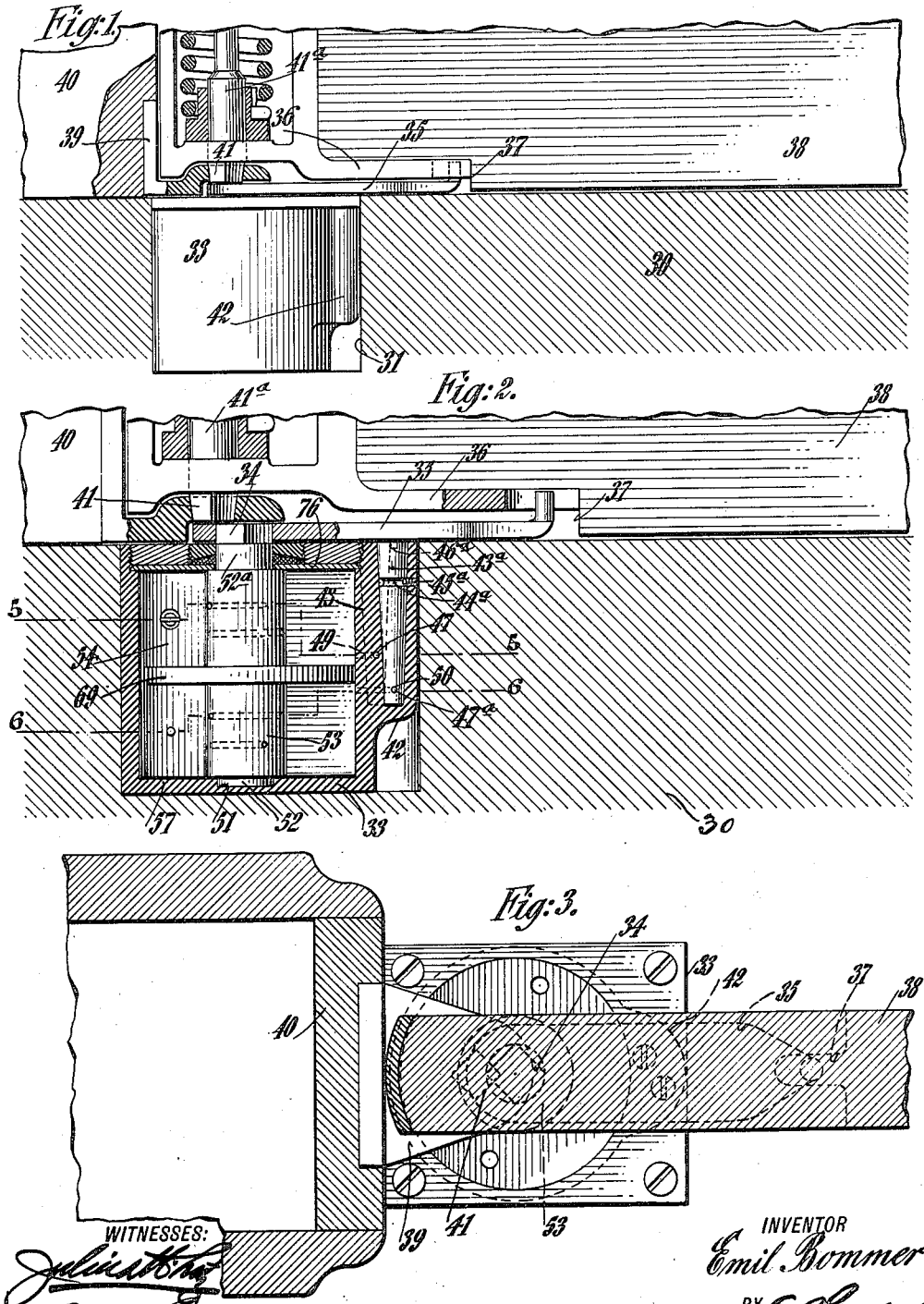

E. BOMMER.
CHECKING DEVICE FOR OSCILLATORY MOVEMENT.
APPLICATION FILED MAR. 11, 1915.
1,241,084. Patented Sept. 25, 1917.
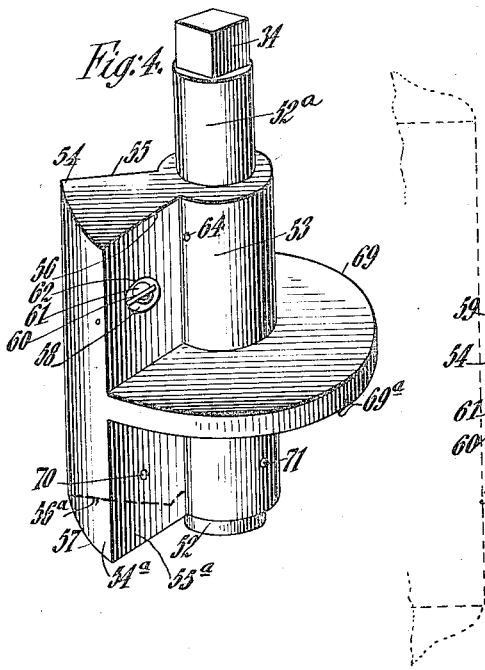
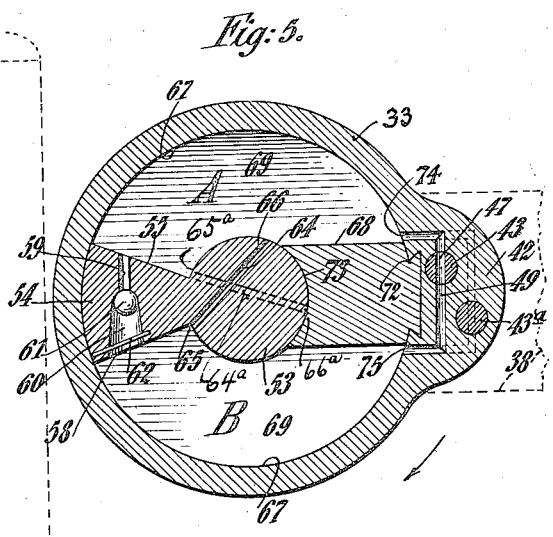
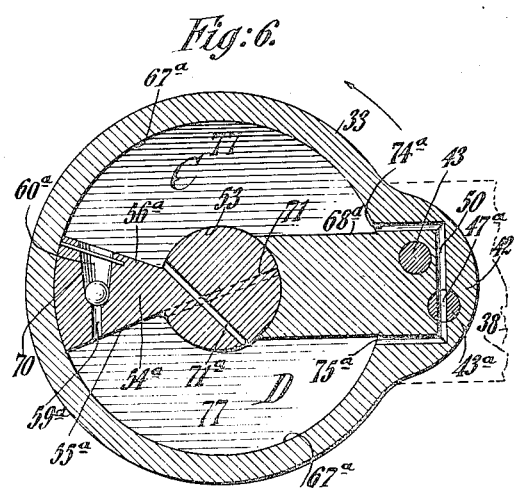
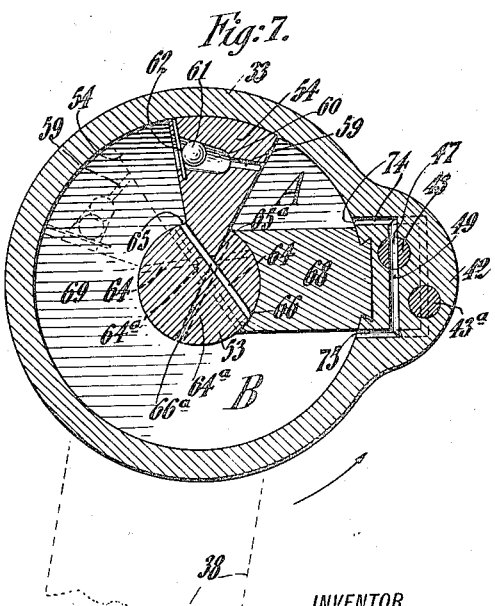
INVENTOR
Emil Bommer
BY C. P. Goepel
ATTORNEY E. BOMMER.
CHECKING DEVICE FOR OSCILLATORY MOVEMENT.
APPLICATION FILED MAR. 11, 1915.
1,241,084.
Patented Sept. 25, 1917.
3 SHEETS—SHEET 3.
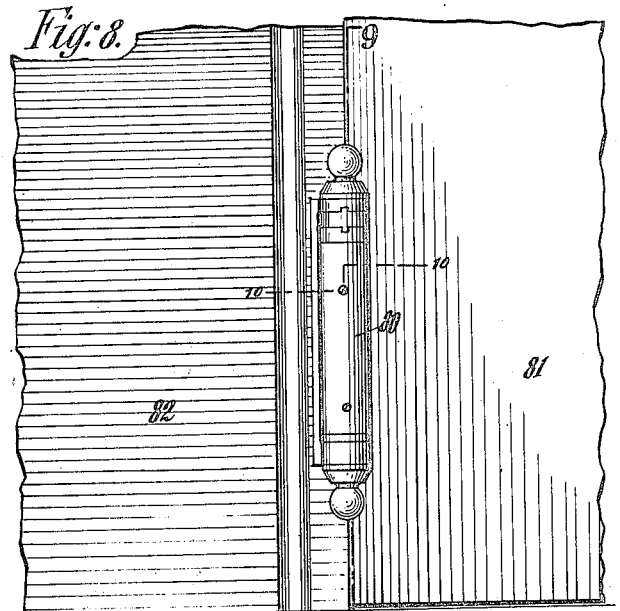
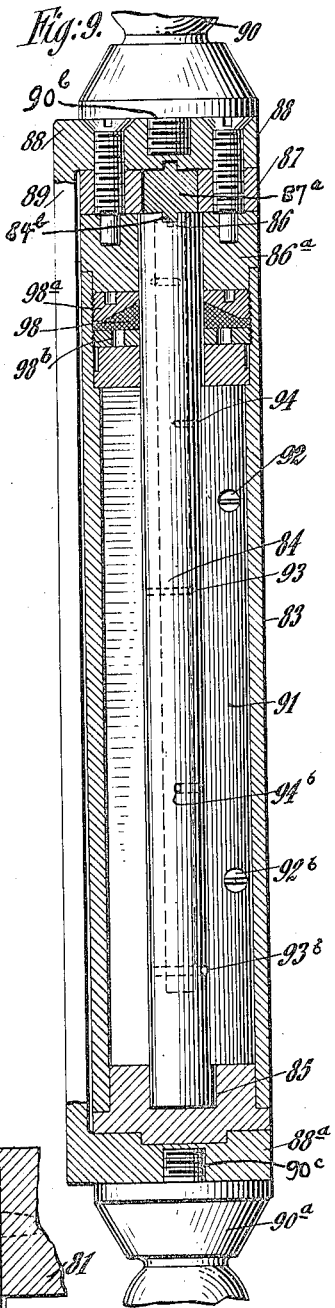
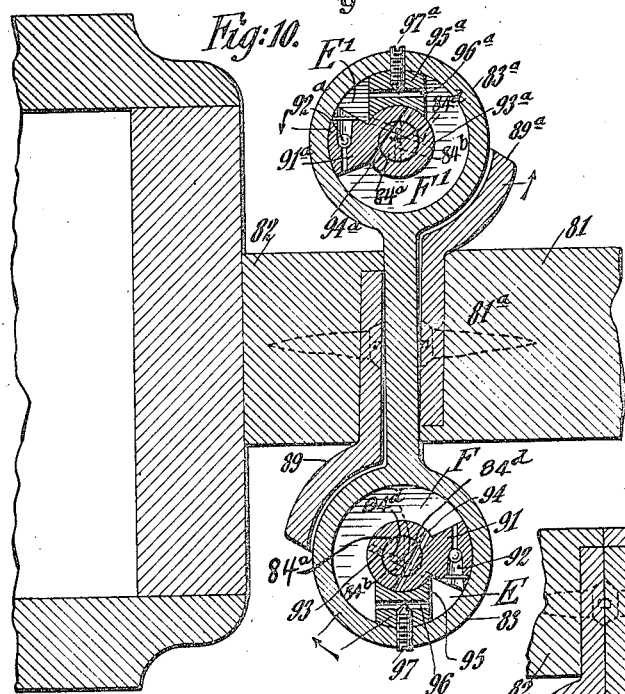
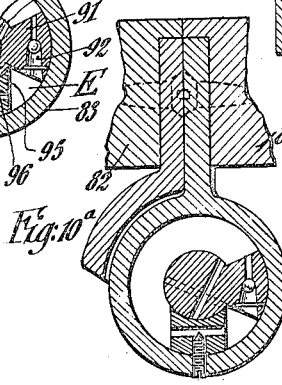
INVENTOR
Emil Bommer
BY
his ATTORNEY
WITNESSES:

UNITED STATES PATENT OFFICE.

EMIL BOMMER, OF BROOKLYN, NEW YORK.

CHECKING DEVICE FOR OSCILLATORY MOVEMENT.

1,241,084.  Specification of Letters Patent.  Patented Sept. 25, 1917.

Application filed March 11, 1915. Serial No. 13,697.

*To all whom it may concern:*

Be it known that I, EMIL BOMMER, a citizen of the United States, and residing in the borough of Brooklyn, county of Kings, city and State of New York, have invented certain new and useful Improvements in Checking Devices for Oscillatory Movement, of which the following is a specification.

This invention relates to checking devices of that class which employs a liquid to assist in the checking action, and which controls the flow of the checking liquid by means of the operating member itself, and more particularly consists in causing the flow of the confined checking liquid from one side of a stationary abutment and a movable wing to the opposite side thereof, through a passage or passages made diametrically through the shaft or spindle of the device, and closing said passages during predetermined moments in the segment of oscillation by their movement over a stationary abutment concentric to said shaft.

The invention is shown in the accompanying drawings, and will be more fully described hereinafter and finally pointed out in the claims.

In the accompanying drawings,

Figure 1 is a side view showing the application through an intermediate member, of my checking device to a door swinging on a pivoted double-acting vertical type of floor-surface spring hinge, as for example shown in Serial Nos. 761,139 and 761,140, now pending;

Fig. 2 is a vertical central section on a somewhat enlarged scale of the mechanism contained in Fig. 1;

Fig. 3 is a plan view of the mechanism shown in Fig. 2, on the same scale as that used in Fig. 2, Fig. 4 is a perspective view of the oscillating member having the fluid controlling valves and channels, which are used in the mechanism shown in Figs. 1 to 3, Fig. 5 is a horizontal section of the mechanism shown in Fig. 2, taken on line 5—5 of Fig. 2, Fig. 6 is a horizontal section taken on line 6—6 of Fig. 2, Fig. 7 is a horizontal section similar to that shown in Figs. 5 and 6, and taken on line 5—5 of Fig. 2, with, however, the door in a different position from that shown in Fig. 5, as is indicated by the dotted lines in the respective figures, Fig. 8 is a front view embodying my improved construction applied to a type of butt-hinge, either single acting or double acting, Fig. 9 is a vertical section taken on line 9—9 of Fig. 8, but showing a valve-stem arranged in the shaft, Fig. 10 is a horizontal section taken on line 10—10 of Fig. 8, as embodied in a type of double acting butt-hinge, having the connecting plate made integral with the barrels and the flanges made integral with the ears, and Fig. 10ᵃ is a similar section embodied in a single action butt-hinge.

Similar reference numerals indicate corresponding parts throughout all the figures of the drawings.

Referring to the drawings and more particularly to Figs. 1 to 7, the floor or threshold 30 has a cut-out portion or mortise 31 to receive a casing 33, in which the checking liquid and mechanism is confined, and which is adapted to be fastened to the floor, said casing 33 having an upwardly-extending shaft 53, journaled therein at 52 and 52ᵃ. This upwardly-extending shaft 53 has a squared or non-circular projecting end portion 34, which is engaged by the socket at one end of a dog 35, which dog likewise engages at its other end a frame 36 of a spring-hinge secured in a cut-out portion 37 of the door 38, thereby imparting the oscillatory motion given to the door when same is opened and closed to the shaft 53 of the casing 33 (this arrangement is preferably applied when the pivotal centers of the door-hinge and of the shaft 53 are not in alinement). A squared socket 39 is, in this embodiment, secured to the door frame 40 and embraces the correspondingly squared end 41 of the spindle or shaft 41ᵃ of the spring hinge.

The wall of the casing 33 may be provided at one side thereof with an enlarged portion 42 in which a valve 43ᵃ may be operated. This valve is provided with an annular recess 44ᵃ, which is engaged by a pin 45ᵃ which pin, coöperating with the recess 44ᵃ, serves to hold the valve 43ᵃ in permanent position in respect to any vertical movement, but does not permit a rotary movement of the valve stem 43ᵃ. This valve stem 43ª is provided at its upper end with a recess 46ª adapted to be engaged by a screw-driver or other suitable tool so as to enable the valve stem 43ª to be conveniently rotated. The valve stem 43ª is provided with a channel indicated by 47ª, which channel passes diametrically through the valve stem and coöperates with the channel 50 in the enlarged portion 42 of the casing 33. A similar valve stem 43 is arranged staggered of the valve-stem 43ª, and its channel 47 coöperates with the channel 49.

The casing 33 is provided at its lower end or base with a socket 51 in which the preferably reduced lower end 52 of a shaft 53 is rotatably journaled, which shaft 53 is provided at its upper end with the squared or non-circular end-portion 34 heretofore referred to, and which end-portion 34 is engaged in locking engagement by the dog 35. A projecting wing 54, Fig. 4, preferably made integral with the shaft 53, has two side faces 55 and 56 forming planes arranged radially of the shaft 52 and has its periphery 57 together with the periphery of the disk-partition 69, arranged circularly concentric to the shaft 53. This wing 54 preferably has a ball valve 58 arranged in a channel 59 passing from one side 55 to the other side 56 of this wing 54. This channel 59 has an enlarged portion 60 to permit the movement of the ball 61, which ball 61 is adapted to close the channel 59. A locking bar or guard 62 or similar obstruction serves to limit the movement of the ball and prevent its falling out. It will be noted that the enlarged portion 60 has inclined walls, this being for the purpose of maintaining an open channel for the checking liquid when the ball is at the wide end and when it is not desired to have the channel 59 closed. The shaft 53 is provided with a channel 64, Fig. 5, which passes in this case from the point 65 to the point 66 of the shaft 53, and a channel 64ª which passes in this case from the point 65ª to the point 66ª. Below the channels 64 and 64ª and the ball valve 58, a disk-partition 69 is arranged, and below this disk-partition 69 the wing 54ª, having faces 55ª and 56ª, is preferably provided with a second ball valve 70 as shown in Fig. 6, arranged, however, in opposite direction, and which is provided with a channel 59ª, and a channel 60ª, each being also arranged in opposite direction to the channels 59 and 60 respectively.

The structure shown thus very clearly in perspective in Fig. 4, and in section in Figs. 5 and 6, is inserted into the interior 67 of the casing 33, the disk-partition 69 and the periphery 57 of the wing 54 are closely fitted within the interior wall of the casing 33, and the shaft 53 is fitted closely to a correspondingly circular portion 73 of an upper abutment 68, which is secured against rotation in that portion of the casing 33 which is above the disk-partition 69, by the dove tails 72 indicated clearly in Fig. 5. The lower abutment 68ª Fig. 6, below the disk-partition 69 is preferably made integral with the wall of the casing 33. At either side of the abutments 68 and 68ª the end portions 74 and 75 and 74ª and 75ª of channels 49 and 50 terminate. The channel 49, Fig. 5, serves to make communication between two chambers formed above the disk-partition 69 by the inner wall of the casing 33, the face 55 of the wing 54, the shaft 53 and one side of the abutment 68, being bounded at the bottom by the upper face of the disk-partition 69 and at the top by the cover 76 of the casing, which chamber for sake of clearness is marked A, Fig. 5. The cover 76 is indicated clearly in Fig. 2, and the chamber B, Fig. 5, which is formed by the face 56 of the wing 54, the inner wall of the casing 33, the shaft 53, the other side of the abutment 68 and by the upper face of the disk portion 69 and the cover 76 of the casing 33. The channel 49 which thus forms a communication between the chamber A and the chamber B, is controlled by the valve stem 43 which is provided with the channel 47. When the channel 47 of the valve stem 43 is in registration with the channel 49, the checking liquid may pass unobstructed through the channel 49, but in the event that the valve stem 43 is turned more or less, the flow of the liquid passing through the channel 49 is governed accordingly, in the well-known manner.

The channel 59 with its enlargement 60, when open by the positioning of the ball 61 in a manner as not to close the channel 59, serves also to make a communication between the chambers A and B. Furthermore, the channel 64 has one end 65 terminating in the chamber B and the other end 66 terminating in the chamber A, thus forming a communication between these two chambers A and B, when the channel 64 is in the position shown in Fig. 5, or in any other position where the flow of the liquid is not impeded by closing one end of the channel 64, as is possible by the relative movement of the shaft 53 carrying with it the channel 64 in its movement in respect to the abutment 68.

As before stated, the portion of the wing below the disk-partition 69 is arranged in substantially the same way as the portion above, with the difference, however, that the ball valve 70, Fig. 6, permits the flow of liquid in the opposite direction to the flow of liquid of the ball valve 58, Fig. 5, and in that the channel 71, Fig. 6, is arranged differently from the channel 64, Fig. 5, and the channel 71ª, Fig. 6, is arranged differently from the channel 64ª, Fig. 5. These parts are clearly shown in Figs. 5 and 6. The shaft 53 forms with one side of the abutment 68ª and with the inner wall of the casing 33, and with the face 56ª, together with the top which is formed by the lower surface 69ª of the disk-partition 69, and the bottom 77 of the casing 33, a chamber, which for brevity, we will call chamber C. The other side of the shaft 53 forms with the other side of the abutment 68ª and the other face 55ª of the wing 54, and the inner wall of the casing 33, together with the lower surface 69ª of the disk-partition 69, and bottom 77 of the casing 33, another chamber which we will call chamber D. These chambers C and D are in communication with each other through the channel 59ª with its enlargement 60ª, and are capable of being brought into communication with each other by means of the channels 71 and 71ª, Fig. 6, depending upon the position of the said channels in respect to the abutment 68ª. The said channels 71 and 71ª operate in a similar manner but in reverse relation to the channels 64 and 64ª, connecting the chambers A and B. The chambers C and D are also in communication with each other by means of the channel 50, which has one end 74ª terminating at one side of the abutment 68ª, and the other end 75ª terminating at the other side of the abutment 68ª. The channel 50 may be regulated by a valve stem 43ª which has an opening 47ª, which opening or channel, when in registration with the channel 50, permits the liquid to flow freely therethrough, but when the valve stem 43ª is rotated more or less, the flow of liquid is controlled more or less.

It will be noted that the valve stem 43ª is placed slightly staggered to the valve stem 43, so as to permit the valve stem 43ª to control the flow of the channel 50, and on the other hand to permit the valve stem 43 to control the flow of liquid in the channel 49, thus giving independent control of each of said channels. This staggered relationship is clearly shown in Figs. 5, 6 and 7, and one of these valve stems is shown in dotted lines in Fig. 2. The valve stem 43ª has a circular recess 44ª, Fig. 2, engaged by a pin or screw 45ª, Fig. 2, and also has a recess 46ª, Fig. 2, to permit it to be rotated radially by a screw-driver or other tool, and the valve-stem 43 is similarly constructed.

In Fig. 7 the position of the wing 54 is changed, depending upon the different position of the door 38, indicated in dotted lines in Figs. 5, 6 and 7.

In Fig. 7 an intermediate position of the wing 54 is shown in dotted lines. It will be noted that as the wing 54 moves from the position shown in Fig. 5 to the position shown in dotted lines in Fig. 7, and from that position to the position shown in full lines in Fig. 7, the liquid in chamber A may readily flow through the channel 60, and in so flowing through this channel, the ball 61 is brought into the position shown in Fig. 7, namely, to rest against the guard 62. Thus, the liquid may freely flow past the ball 61 from chamber A to chamber B through the channel 60. It will also be noted that there is a possibility of a free flow of the liquid between chambers A and B through the channel 49. It will also be noted that the channel 64 has its end 65 in free communication with the chamber B, but has its other end 66 closed while the channel 64ª has its ends 65ª closed by the abutment 68. When the wing is in the position shown in dotted lines in Fig. 7, the channel 64 has one end 65 freely communicating with the chamber B, but has its other end 66 blocked or closed by the abutment 68.

To enable the operation of this wing with its valves to be readily understood, we will assume that the door is in its initial position, as shown in Fig. 5. For the moment, we will assume a momentary closure of the channel 59 by the ball 61, as indicated in Fig. 5. It will be noted that there is a free communication between chambers A and B through the channel 64. A free communication exists between chambers A and B through the channel 49. As the door 38 is moved from its initial position shown in Fig. 5 in the direction of that position indicated by dotted lines in Fig. 7, the ball 61 will drop against the guard 62 and a free communication will, therefore, exist between the chambers A and B through the channel 59. Hence, as the wing 54, which is integral with or secured to the shaft 53, is moved from its position shown in Fig. 5 in the direction of the position indicated in dotted lines in Fig. 7, by the movement of the door 38 which is imparted by the dog 35 to the squared or non-circular head 34 of the shaft 53, the liquid in chamber A can flow freely from chamber A to the chamber B through the channel 59, and thus little or no resistance is offered to the movement of the wing 54 within the casing 33. The liquid has also a free flow through the channel 64 from the position of the part shown in Fig. 5 to that position where the end 66 of the channel 64 is closed by the abutment 68. When this condition takes place, the channel 64, of course will be closed; but the end 66ª of the channel 64ª will have passed the abutment 68 and the channel 64ª will remain open until the end 65ª is closed by the abutment 68; the checking liquid will also flow through the channel 59 from chamber A to chamber B, without any appreciable result in the work necessary to move the door. Finally when the door reaches the position shown in dotted lines in Fig. 7, and the wing 54 reaches the position shown in full lines in Fig. 7, we will assume that the door is as far open as it is desired. In fact, it is as far open as the particular construction shown in the embodiment of Fig. 7 permits. Thereafter, the direction of movement of the door 38, under the influence of a spring hinge, door spring or other door-closing device, is changed in direction toward its initial position, as shown in Fig. 5. The attempted flow of liquid through the channel 60 will immediately move the ball 61 into a position to close the channel 60, and this will greatly reduce the further flow of liquid from the chamber B to the chamber A, as shown in Figs. 5 and 7, or vice versa from chamber C to chamber D in the case of Fig. 6, and hence a resistance will be offered to the door in its movement toward its initial position. As the channel 64 is closed by reason of having one end abut against the abutment 68, this checking action will prevent a quick closing of the door. The still further reduced flow of liquid that is possible from chamber B to chamber A, through the channel 64ª until its end 66ª is closed by the abutment 68, and finally through the channel 49, is sufficient to prevent any sudden shock in applying the checking action and when the end 66ª of the channel 64ª is closed by the abutment 68, the checking liquid is under its maximum compression and the checking action is greatest. It will be clearly understood that the channel 49 is now the only channel still remaining open between the chambers A and B, Figs. 5 and 7, and that the intensity and speed of the checking action can be controlled by restricting the area of the channel 49 more or less by means of the valve 43; it will also be noted that when the door is in nearly closed position, the end 66 of the channel 64 has passed the abutment 68 and thereby the checking action is released, and thereby the spring-hinge, door spring or other door-closing device is enabled to quickly close the door, and thus insure the latching or engagement of the door lock with its keeper on the door-casing. But up to this release or neutralization of compression of the checking liquid in chambers A and B, the checking action results by reason of the compressing effect of the wing 54 of the shaft 53 upon the checking liquid when the door is being closed, and the forcing of the checking liquid through the channels of the shaft at intervals determined by the location and direction of the channels of the shaft.

The shaft 53 is provided below the disk-partition with a mechanism in duplicate of that above described, but operating in reverse relation, when the door is operated in the direction opposite to the just described direction. The adjustment of the valve stem 43, or 43ª, controlling the flow of liquid through the channels 49, Figs. 5 and 7, or 50, Fig. 6, will, as before explained, determine the intensity of the checking action. The wing 54ª with its ball valve 70 and the channel 59ª operate in a similar manner as just described, but this operation is carried out only in that case where the movement of the door is in the direction opposite to that indicated in Fig 6, namely, in that direction, for instance, from the dotted line position shown in Fig. 5 to a position in the direction of the arrow. The ball valves and channels and the shaft 53 are so arranged that when the upper one operates, the lower one is inoperative in the sense that it does not act as a checking member, but permits the free flow of the liquid therethrough, and thus the device is described and shown in Figs. 1 to 7 as capable of a double-acting operation.

In Figs. 8 to 10ª the construction just described is made applicable to double-acting and single-acting butt-hinges, as clearly shown in Fig. 8, where the barrel of such a hinge 80 indicates the position of the hinge in respect to the door 81 and frame 82, the hinge being secured to the door by screws 81ª. The drawing shown in Fig. 8 may represent either a double-acting butt-hinge or a single-acting butt-hinge.

Referring more particularly to Fig. 9, the barrel 83 has the shaft 84 rotatably journaled at its lower end in a collar 85 attached to or made integral with the barrel 83, and has its upper end locked to a key 86 of a perforated key-plate 87 and is also journaled in interior collars 98ª, 98ᵇ of the barrel, the upper end of the shaft passes through collar 86ª which extends above the barrel, and which collar 86ª is non-rotatably connected, together with the key-plate 87 (preferably by screws) to the ear 88, which is made integral with the leaf 89 secured to the door frame 82, as shown in Figs. 10 and 10ª. Ball tips or other tips 90 and 90ª having screw-studs 90ᵇ and 90ᶜ may be attached to perforations of the ears 88 and 88ª. The shaft 84 is provided with a wing 91 which has the ball valve 92 therein, and which has a channel 93 below the ball valve 92 and the channel 94 above the ball valve 92. Because of the length of this construction of hinge, I preferably provide a similar arrangement, comprising a valve 92ᵇ and channels 93ᵇ and 94ᵇ in the lower part of the same. The casing 83 is provided with an abutment 95 which is secured to or made integral with the casing 83, and which has a channel 96, Fig. 10, to permit the flow of liquid from the chamber E to the chamber F, which flow is regulated by the adjustable screw 97. The ball valve 92, channels 93 and 94, as also channel 96, all coöperate in the manner described in connection with Figs. 1 to 7.

A similar construction is shown in the other barrel or casing 83ª of the double-acting hinge shown in Fig. 10, and in this case the ears are made integral with the leaf 89ª, which leaf is secured to the door 81. An abutment 95ª having a channel 96ª and an adjusting screw 97ª, and a wing 91ª having a ball valve 92ª, a release channel 94ª, and a second release channel 93ª, are provided, which all coöperate in the manner described, and for this reason a detailed description thereof is not entered into, it being noted, however, that the parts shown in the barrel 83 and in the barrel 83ª are substantially like each other, but different in the respect that they are positioned opposite to each other but symmetrical to each other. In Figs. 9 and 10 an alternate arrangement of the valve stem is indicated in dotted lines. This modification consists in placing within the shaft 84 a valve stem 84ª having channels 84ᵈ coöperating with the channels of the shaft. It will be noted that by unscrewing the pintle knob 90 convenient access to the screw slot 84ᵇ of the valve stem 84ª is provided through the ear 88 and through the perforation 87ª of the key-plate 87 so that by turning the valve stem slightly, more or less, the channels 93, 94, 93ᵇ 94ᵇ of the shaft are closed more or less, and thereby the flow of the checking liquid is correspondingly restricted.

From the various embodiments described, it will be noted that after the door is opened, the checking action can be controlled by the positioning of the shaft channels and that the release action desirable just prior to the final closure of the door, can be predetermined by the positioning of the channels in the shaft. By this action and by the regulation of the flow of the checking liquid, a very efficient, and at the same time very simple form of checking device is provided, which lends itself to its application for the various forms of door-closing devices, in cases where the pivotal center of the door is not in agreement with the pivotal center of the checking device, a suitable connecting dog or suitable arm is interposed between the centers, as has been indicated in the various embodiments shown in the drawings.

I have shown several embodiments of my invention but it is clear that changes may be made therein without departing from the spirit thereof as defined in the appended claims.

I have also shown that one or more channels or multiples thereof can be used to connect the dual chambers through the shaft and that the channels can be so placed as to determine the effective checking and releasing intervals. All the devices shown can be used in inverted position, that is to say, they may be applied to the top of the door in connection with any ordinary pivot at the bottom of the door, as well as in the positions indicated in the drawings.

I claim:—

1. A checking device, comprising a checking liquid containing chamber, dividing means therein forming compartments therein, comprising a stationary abutment and a shaft member provided with a winged extension oscillable with respect thereto, to change the relative volume of the compartments of said chamber, the said shaft being provided with channel means for the transference of liquid from one compartment to the other, and coöperating with the said abutment during the closing movement of said shaft to successively permit and prevent for relatively long periods, and permit for a relatively short period at the end of the closing movement, the flow of liquid from one compartment to the other, means in the said wing for permitting and preventing the flow of liquid therethrough respectively during the opening and closing oscillatory movement thereof, and means adapted to permit the flow of the liquid from one compartment to the other in either direction of movement of the said oscillatory means.

2. A checking device, comprising a checking liquid containing chamber, dividing means therein forming compartments, and comprising a stationary abutment, and a shaft member provided with a winged extension, oscillable with respect thereto to change the relative volume of the compartments of said chamber, the said shaft being provided with channel means for the transference of liquid from one compartment to the other, and coöperating with the said abutment during the closing movement of said shaft to successively permit and prevent for relatively long periods, and permit for a relatively short period at the end of the closing movement, the flow of liquid from one compartment to the other, means in the said wing for permitting and preventing the flow of liquid therethrough respectively during the opening and closing oscillatory movement thereof, and channel means extending through the stationary part of said chamber adapted to permit the flow of liquid from one compartment to the other in either direction of movement of the said oscillatory means.

3. A checking device, comprising a checking liquid containing chamber dividing means therein comprising a stationary abutment, and a shaft member provided with a winged extension oscillable with respect thereto, to change the relative volume of the compartments of said chamber, the said shaft being provided with channel means for the transference of liquid from one compartment to the other, and coöperating with the said abutment during the closing movement of the shaft to successively permit, prevent and permit the flow of liquid from one compartment to the other, means in said wing for permitting and preventing the flow of liquid therethrough respectively during the opening and closing oscillatory movement thereof, channel means extending through the stationary part of said chamber adapted to permit the flow of liquid from one compartment to the other in either direction of movement of the said oscillatory means, and means controllable from the exterior of said chamber for regulating the flow of liquid through said last named channel means.

4. A checking device, comprising a checking liquid containing chamber, an oscillable shaft, a disk partition on the shaft, means above and below the disk partition, one operating reversely in respect to the other, with one opposing passage and the other permitting passage of the checking liquid, and each comprising a wing on the shaft having means permitting the flow of a checking liquid therethrough when the shaft is moved in one direction, and preventing the flow of checking liquid therethrough when moved in the other direction, the said means of each wing operating reversely, a fixed abutment in the containing member, the abutment, wings, and shaft dividing the containing member into two compartments, channel means in the shaft for the transference of the liquid from one compartment to the other, and coöperating with the said abutment during the respective closing movement of the shaft to successively permit, prevent and permit the flow of liquid from one compartment to the other, channel means above and below the disk extending through the stationary part of said chamber adapted to permit the flow of liquid from one compartment to the other in either direction of movement of said shaft, and means controllable from the exterior of the said chamber for regulating the flow of liquid through said last named channel means.

In testimony that I claim the foregoing as my invention, I have signed my name in presence of two subscribing witnesses.

EMIL BOMMER.

Witnesses:
D. LEWIS MATTERN,
JOS. BISBANO.